Dec. 18, 1923.
L. R. ZIFFERER
PIPE HANGER
Filed May 11, 1922
1,477,621
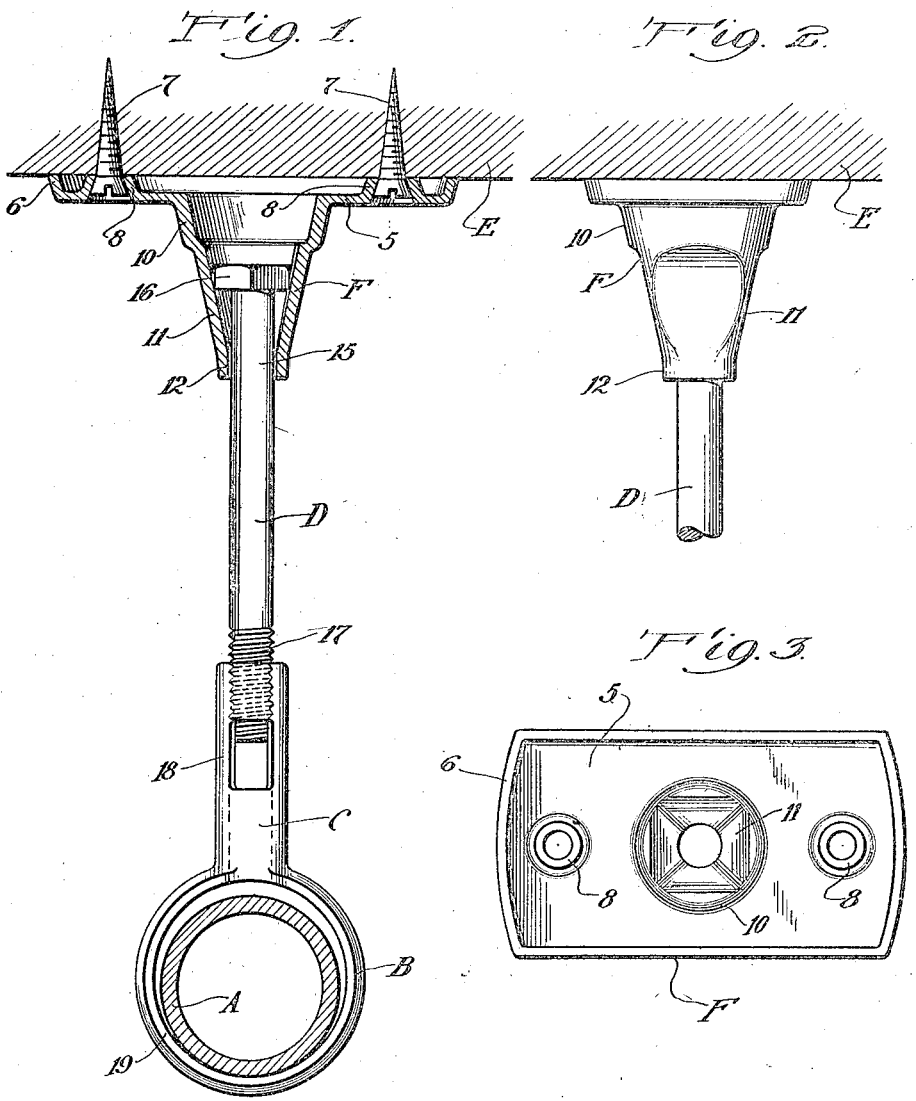
Inventor:
Lothar R. Zifferer, Patented Dec. 18, 1923.

1,477,621

UNITED STATES PATENT OFFICE.

LOTHAR R. ZIFFERER, OF LANCASTER, PENNSYLVANIA.

PIPE HANGER.

Application filed May 11, 1922. Serial No. 560,022.

*To all whom it may concern:*

Be it known that I, LOTHAR R. ZIFFERER, a citizen of the United States, residing at Lancaster, in the county of Lancaster and State of Pennsylvania, have invented certain new and useful Improvements in Pipe Hangers, of which the following is a specification.

This invention relates to certain improvements in a hanger assembly such as is used for suspending the pipe line of a fire extinguishing sprinkler system; and more particularly it is concerned with the supporting element which attaches to the ceiling and from which the hanger per se is depended.

An exemplification of this invention is shown in the accompanying drawing wherein Figure 1 is a side elevation of the hanger, the support therefor being illustrated in vertical section;

Fig. 2 is a view in elevation of the supporting element; and

Fig. 3 is a plan view thereof.

In the drawing I have shown a pipe A supported by a hanger consisting of a ring B from which is extended a sleeve C adjustably mounted on a bolt D. Connecting the hanger to the ceiling E is a supporting element F which embodies certain novel and improved features as follows:

I construct the support with a base in the form of a plate 5 having a marginal flange 6 adapted to rest against the ceiling, or a beam thereof. As shown, the support is secured to the ceiling with bolts or screws 7 the shanks of which are inserted through hollow bosses 8 formed in the base. Depending from the support base in its central region are tapering walls forming a truncated cone having a circular cross section at 10 and therebelow a polygonal cross section 11 which merges into a cylindrical contour as at 12 at the lower extremity of the cone.

With a supporting element answering to this description, the hanger bolt is adapted for association in the manner shown in Fig. 1, where it will be noted the bolt shank is shown to be slightly less in diameter than the opening in the lower or smaller end of the cone. The bolt head 16, here shown as square, is adapted to rest against the correspondingly shaped tapering walls 11 so as to fit non-rotatably and tightly therewithin. The assembly of the bolt within the support is, of course, attended to before the support is secured to the ceiling. At its lower end the bolt shank is provided with threads upon which may be secured the sleeve C which may be adjustable to the desired position longitudinally thereupon.

In practice it is found that bolts such as are used for pipe hangers, vary considerably in diameter and also in external configuration, although the threads formed thereon may conform to a standard size. The same observations apply with reference to the bolt heads which are not always uniform in shape or size. With the supporting element of this invention, I am enabled to use bolts of various sizes since the point of connection therebetween may shift lengthwise of the tapering walls of the truncated cone, as required in each individual case. When in final position, as indicated in Fig. 1, the bolt shank may clear the walls of the support, which, however, will act to hold the bolt securely through its engagement with the bolt head. In the enlarged circular portion of the cone, defined by the walls 10, the bolt head may, of course, be freely revolved, and it is therefore possible, by lifting the hanger and bolt sufficiently to raise the head into this enlarged area to rotate the bolt for purposes of vertically adjusting the pipe, following which the bolt head resumes its non-rotative engagement with the tapered walls of the support.

The supporting element herein described may be produced according to any approved method, as by casting or stamping, but it may also be variously modified from the exact form shown without departing from the spirit of my invention, the scope of which is to be determined by reference to the appended claim, as follows:

I claim:

As a new article of manufacture, a bolt support having a base adapted for attachment to a fixed object, there being extended from the base a truncated tapering cone having its greatest diameter adjacent the base at which point the cone walls are circular in cross section, the cone walls elsewhere being configured to provide a polygon in cross section such as to engage nonrotatably with the bolt head, substantially as described.

LOTHAR R. ZIFFERER.

Witness:
EPHRAIM BANNING.